United States Patent
Suzuki

(12) 
(10) Patent No.: US 6,627,114 B2
(45) Date of Patent: Sep. 30, 2003

(54) RARE EARTH OXIDE TYPE PHOSPHOR FOR VACUUM ULTRAVIOLET RAY EXCITATION, PHOSPHOR PASTE COMPOSITION AND VACUUM ULTRAVIOLET RAY EXCITATION TYPE LIGHT-EMITTING DEVICE

(75) Inventor: Hideo Suzuki, Odawara (JP)

(73) Assignee: Kasei Optonix, Ltd., Odawara (JP)

( * ) Notice: Subject to any disclaimer, the term of this patent is extended or adjusted under 35 U.S.C. 154(b) by 0 days.

(21) Appl. No.: 10/085,058

(22) Filed: Mar. 1, 2002

(65) Prior Publication Data

US 2002/0158234 A1 Oct. 31, 2002

(30) Foreign Application Priority Data

Mar. 2, 2001 (JP) ........................................ 2001-058260

(51) Int. Cl.$^7$ ................................................ C04K 11/78
(52) U.S. Cl. .................... 252/301.4 R; 252/301.4 P; 428/403; 428/404; 313/582; 313/584; 313/643
(58) Field of Search .............................. 313/582, 584, 313/643; 428/403, 404; 252/301.4 R, 301.4 P

(56) References Cited

FOREIGN PATENT DOCUMENTS

| JP | 8-319483 | 12/1996 |
|----|----------|---------|
| JP | 11-73887 | 3/1999 |

*Primary Examiner*—C. Melissa Koslow
(74) *Attorney, Agent, or Firm*—Oblon, Spivak, McClelland, Maier & Neustadt, P.C.

(57) ABSTRACT

A phosphor for vacuum ultraviolet ray excitation, which comprises a rare earth oxide type phosphor, wherein at least part of the surface of the rare earth oxide type phosphor is coated with a compound containing at least a magnesium element and a phosphorus element.

7 Claims, No Drawings

RARE EARTH OXIDE TYPE PHOSPHOR FOR VACUUM ULTRAVIOLET RAY EXCITATION, PHOSPHOR PASTE COMPOSITION AND VACUUM ULTRAVIOLET RAY EXCITATION TYPE LIGHT-EMITTING DEVICE

BACKGROUND OF THE INVENTION

1. Field of the Invention

The present invention relates to a rare earth oxide type phosphor which is excited by vacuum ultraviolet rays (VUV) having a wavelength of at most 200 nm and emits light highly efficiently, a phosphor paste containing said phosphor, and a light-emitting device comprising a phosphor layer containing said phosphor. Particularly, it relates to a rare earth oxide type phosphor for VUV excitation, with which a decrease of brightness with time is small, suitable for a vacuum ultraviolet ray excitation type light-emitting device (VUV excitation type light-emitting device) such as a plasma display panel (PDP) or a rare gas discharge lamp.

2. Discussion of Background

A VUV excitation type light-emitting device represented by e.g. PDP or a rare gas discharge lamp, comprises a transparent envelope and a phosphor layer containing a phosphor for VUV formed inside of the envelope, so that the phosphor layer is excited by VUV having a wavelength of at most 200 nm, radiated by discharge of a rare gas sealed in the envelope, such as Ar, Xe, He, Ne, He—Xe or Ne—Xe, to emit visible light.

With respect to the phosphor for VUV to be used for the phosphor layer for the VUV excitation type light-emitting device, it undergoes baking deterioration due to heat in a baking treatment at the time of the phosphor layer formation, and further, it undergoes deterioration due to VUV irradiation or ion impact at the time of discharge of a rare gas, thus leading to a decrease of luminescence brightness. Accordingly, it is required for the phosphor for VUV that the baking deterioration is small (baking resistance) and the deterioration due to VUV or ion impact is small (VUV resistance, ion impact resistance).

Here, as the phosphor for VUV, a red color-emitting phosphor such as $(Y,Gd)BO_3:Eu$, $Y_2O_3:Eu$ or $(Y,Gd)_2O_3:Eu$, a green color-emitting phosphor such as $Zn_2SiO_4:Mn$, $LaPO_4:Ce, Tb$ or $(Ba, Sr, Mg)O.aAl_2O_3:Mn$, or a blue color or blue green color-emitting phosphor such as $BaMgAl_{10}O_{17}:Eu$, $BaMgAl_{10}O_{17}:Eu$ or $Mn$, may, for example, be used.

Among these phosphors for VUV, particularly with respect to a rare earth oxide type phosphor for VUV excitation represented by the formula $(Y_{1-x-y}, Ln_x, Re_y)_2O_3$ wherein Ln is at least one rare earth element selected from the group consisting of Gd, La and Lu, Re is at least one rare earth element selected from the group consisting of Eu, Tm, Sm and Pr, and x and y are numbers which satisfy conditions $0 \leq x \leq 1-y$ and $0.001 \leq y \leq 0.1$, such as $Y_2O_3:Eu$ or $(Y,Gd)_2O_3:Eu$, when continuously used as a phosphor layer for a VUV excitation type light-emitting device, a decrease of brightness with time tends to be significant, and improvement has been desired.

SUMMARY OF THE INVENTION

The present invention has been made to overcome the above problems, and it is an object of the present invention to provide a rare earth oxide type phosphor with which a decrease of luminescence brightness with time is small, and which is excellent in VUV resistance with less deterioration due to VUV or ion impact, when used under excitation by VUV having a wavelength of at most 200 nm for a long period of time, a phosphor paste composition and a VUV excitation type light-emitting device.

The present inventors have conducted extensive studies on improvement of the VUV resistance of a phosphor by subjecting the phosphor to surface treatment, and as a result, have found that by coating the surface of a rare earth oxide type phosphor with a compound containing Mg and P in its composition such as magnesium phosphate, the VUV resistance improves, and the decrease of luminescence brightness with time can be suppressed when the phosphor is irradiated with VUV to emit light, and the present invention has been accomplished.

Namely, the present invention provides:

(1) A phosphor for vacuum ultraviolet ray excitation, which comprises a rare earth oxide type phosphor, wherein at least part of the surface of the rare earth oxide type phosphor is coated with a compound containing at least a magnesium element and a phosphorus element.

(2) The phosphor for vacuum ultraviolet ray excitation according to the above (1), wherein the vacuum ultraviolet rays for excitation have a wavelength of at most 160 nm.

(3) The phosphor for vacuum ultraviolet ray excitation according to the above (1) and (2), wherein the rare earth oxide type phosphor is represented by the following formula:

$$(Y_{1-x-y}, Ln_x, Re_y)_2O_3$$

wherein Ln is at lease one rare earth element selected from the group consisting of Gd, La and Lu, Re is at least one rare earth element selected from the group consisting of Eu, Tm, Sm and Pr, and x and y are numbers which satisfy conditions $0 \leq x \leq 1-y$ and $0.001 \leq y \leq 0.2$.

(4) The phosphor for vacuum ultraviolet ray excitation according to the above (3), wherein Re is Eu.

(5) The phosphor for vacuum ultraviolet ray excitation according to any one of the above (1) to (4), wherein the compound containing at least a magnesium element and a phosphorus element is a magnesium phosphate type compound.

(6) The phosphor for vacuum ultraviolet ray excitation according to any one of the above (1) to (5), wherein the content of magnesium is within a range of from 0.001 to 2 wt %, preferably from 0.01 to 0.5 wt %, on the basis of the weight of the rare earth oxide type phosphor.

(7) The phosphor for vacuum ultraviolet ray excitation according to any one of the above (1) to (6), wherein the content of phosphorus is within a range of from 0.001 to 2 wt %, preferably from 0.01 to 0.4 wt %, on the basis of the weight of the rare earth oxide type phosphor.

(8) A phosphor paste composition comprising a binder solution and the phosphor for vacuum ultraviolet ray excitation as defined in any one of the above (1) to (7), dispersed in the solution.

(9) A vacuum ultraviolet ray excitation type light-emitting device comprising an envelope and a phosphor layer formed inside of the envelope, so that the phosphor layer is excited by vacuum ultraviolet rays generated by discharge of a rare gas sealed in the envelope, to emit light, wherein the phosphor layer comprises the phosphor for vacuum ultraviolet ray excitation as defined in any one of the above (1) to (7).

(10) The vacuum ultraviolet ray excitation type light-emitting device according to the above (9), wherein the vacuum ultraviolet rays include at least vacuum ultraviolet rays having wavelengths of from 160 to 120 nm.

DETAILED DESCRIPTION OF THE PREFERRED EMBODIMENTS

According to the present invention, there is provided a rare earth oxide type phosphor which highly efficiently emits light under excitation with vacuum ultraviolet rays (VUV) having a wavelength of at most 200 nm, particularly at most 160 nm, and which has an excellent brightness maintenance ratio, by coating at least part of the surface of a rare earth oxide type phosphor with a magnesium phosphate type compound containing at least a Mg element and a P element as constituents in its composition, such as magnesium phosphate.

The rare earth oxide type phosphor for VUV excitation may be a phosphor which emits light with high brightness under irradiation with VUV having a wavelength of at most 200 nm, and a phosphor represented by the following formula may, for example, be used:

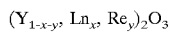

$(Y_{1-x-y}, Ln_x, Re_y)_2O_3$ wherein Ln is at least one rare earth element selected from the group consisting of Gd, La and Lu, Re is at least one rare earth element selected from the group consisting of Eu, Tm, Sm and Pr, and x and y are numbers which satisfy conditions $0 \leq x \leq 1-y$ and $0.001 \leq y \leq 0.2$, preferably $0 \leq x \leq 0.4-y$ and $0.02 \leq y \leq 0.1$. Specifically, a $Y_2O_3$:Eu phosphor and $(Y,Gd)_2O_3$:Eu phosphor may, for example, be mentioned.

The magnesium phosphate type compound to be used for coating of the surface of the rare earth oxide type phosphor of the present invention is not particularly limited so long as it is a compound containing at least a Mg element and a P element in its composition, and examples of which include orthohydrogen phosphates of Mg such as magnesium orthophosphate ($Mg_3(PO_4)_2$), magnesium hydrogenphosphate ($MgHPO_4$) and magnesium dihydrogenphosphate ($Mg(H_2PO_4)_2$), magnesium metaphosphates such as magnesium dimetaphosphate ($MgP_2O_6$), magnesium trimetaphosphate ($Mg_3(P_3O_9)_2$) and magnesium tetrametaphosphate ($Mg_2P_4O_{12}$), and magnesium salts containing chain ions $[(PO_3)_nO]_{(n+2)}(n \geq 2)$ formed by condensation of magnesium phosphate and phosphate ions, such as magnesium polyphosphates such as $Mg_2P_2O_7$ and $Mg_3P_2O_{13}$, and hydrates thereof.

In the present invention, the contents of Mg and P in the coating on the surface of the phosphor vary depending upon the chemical composition of the magnesium phosphate type compound, but the Mg content is from 0.001 to 2 wt %, preferably from 0.01 to 0.5 wt %, based on the weight of the phosphor, and the content of P is from 0.001 to 2 wt %, preferably from 0.01 to 0.4 wt %, based on the weight of the phosphor. If the content of Mg is less than 0.001 wt % or the content of P is less than 0.001 wt %, the decrease of luminescence brightness with time of the phosphor to be obtained due to irradiation with VUV is not substantially suppressed, and if the content of Mg is higher than 2 wt % or the content of P is higher than 2 wt %, the decrease of the initial brightness of the phosphor to be obtained tends to be significant, such being unfavorable.

In the present invention, as a method of coating the surface of the rare earth oxide type phosphor with the magnesium phosphate type compound, for example, the rare earth oxide type phosphor is suspended in e.g. water to prepare a phosphor slurry, and a soluble Mg compound such as magnesium sulfate is added thereto, or a solution having a Mg compound dissolved therein is prepared separately, and this solution is added to the phosphor slurry so that $Mg^{2+}$ ions coexist in the phosphor slurry. Then, the phosphorus compound containing phosphate ion, such as ammonium phosphate or ammonium polyphosphate is added to the phosphor slurry and made to react with $Mg^{2+}$ to form an insoluble magnesium phosphate type compound so that at least part of the surface of the phosphor particles is coated with the magnesium phosphate type compound. Then, dehydration and drying at from 100 to 200° C. are carried out to form a coating of the magnesium phosphate type compound on at least part of the surface of the phosphor to obtain the phosphor of the present invention. Here, with respect to the order of addition of the Mg compound and the phosphorus compound to be added to the phosphor slurry, the Mg compound is added first in the above explanation, however, needless to say, the phosphorus compound may be added first to conduct coating similarly.

The rare earth oxide type phosphor coated with a magnesium phosphate type compound thus obtained may further be baked at a temperature of from 200 to 800° C., in order to reinforce the coating force of the magnesium phosphate type compound, to remove water content in the coating or to change e.g. hydroxyl groups into an oxide.

The phosphor paste composition for VUV of the present invention is obtained by kneading the above phosphor and an organic solvent having a predetermined amount of a binder dissolved therein (binder-containing solution) so that the phosphor and the binder are uniformly dispersed in the organic solvent. Here, the amount of the organic solvent in the binder-containing solution may optionally be increased or decreased to obtain a desired viscosity. Further, an organic solvent may further be added to the prepared phosphor paste composition so as to adjust the viscosity of the phosphor paste composition.

As the binder, a resin such as ethyl cellulose, an acryl resin, polystyrene oxide or nitrocellulose may be used, and as the organic solvent, butyl carbitol, butyl carbitol acetate, terpineol, butyl acetate, ethyl acetate or methyl ethyl ketone may, for example, be used.

The amount of the phosphor in the phosphor paste composition of the present invention is suitably from 5 to 80 wt %, preferably from 20 to 60 wt %, based on the total amount of the paste. Further, the amount of the binder in the binder-containing solution is suitably from 2 to 80 wt %, preferably from 5 to 40 wt %, based on the binder-containing solution.

The VUV light-emitting device of the present invention can be produced by a conventional method by using the above phosphor paste composition. Namely, when the VUV light-emitting device of the present invention is PDP, it is produced in such a manner that, for example, by using a glass plate having plurality of partition walls (ribs) and electrodes provided thereon, the phosphor paste composition of the present invention is coated on the inner surface of plural recesses surrounded by the partition walls (ribs), dried and then baked at a temperature of from about 300 to about 550° C. to prepare a rear plate having a phosphor layer and electrodes formed thereon, and this rear plate and a front plate made of e.g. a flat glass plate which is transparent to visible light, having e.g. an electrode, a dielectric layer and a protective layer laminated in order thereon, are disposed to face each other, the periphery of the front and rear plates is sealed to form an envelope, the interior of the envelope is evacuated, and a rare gas such as Xe, Ar, He or Ne by itself or in combination as mixed is sealed in.

Further, when the VUV light-emitting device of the present invention is a rare gas lamp, it is produced in such a manner that, for example, the above phosphor paste composition comprising the phosphor for VUV of the present invention is coated on an inner wall of a glass tube having an inner diameter of from 4 to 12 mm, dried at from 100 to 200° C. and then baked at from 400 to 800° C. for from 5 to 30 minutes, and electrodes of e.g. nickel are attached to both ends of the glass tube, to the inside and outside of the glass tube or to the outer surface of the glass tube, the interior of the tube is evacuated, a rare gas such as a mixed gas of Ne—Xe or a mixed gas of He—Xe is sealed in, and both ends of the glass tube are sealed.

Now, the present invention will be described in detail with reference to Examples. However, it should be understood that the present invention is by no means restricted to such specific Examples.

Preparation of Phosphor

EXAMPLE 1

100 g of a $Y_2O_3$:Eu phosphor was introduced into a container having water put therein to prepare a phosphor slurry in a total amount of about 400 ml, and 14.5 ml of a 100 g/l sodium phosphate ($Na_3PO_4.12H_2O$) aqueous solution which was prepared separately was added to the obtained phosphor slurry.

Then, to this phosphor slurry, 7.0 ml of a 200 g/l magnesium sulfate ($MgSO_4.7H_2O$) aqueous solution which was prepared separately was dropwise added to form a precipitate of magnesium phosphate in the slurry, and the slurry was stirred for 20 minutes, then dehydrated and dried to obtain a phosphor for VUV excitation of Example 1 coated with magnesium phosphate.

EXAMPLES 2 TO 5

Phosphors for VUV of Examples 2 to 5 coated with magnesium phosphate were obtained in the same manner as in Example 1 except that the addition amount of the sodium phosphate aqueous solution was changed from 14.5 ml to 1.5 ml, 5.8 ml, 28.9 ml and 57.8 ml, respectively, and the amount of the magnesium sulfate aqueous solution added dropwise was changed from 7.0 ml to 0.7 ml, 2.8 ml, 14.0 ml and 28.1 ml, respectively.

EXAMPLE 6

A phosphor for VUV of Example 6 coated with magnesium polyphosphate was obtained in the same manner as in Example 1 except that 20.0 ml of a 50 g/l sodium polyphosphate ($Na_4P_2O_7.10H_2O$) aqueous solution which was prepared separately was added to the phosphor slurry instead of 14.5 ml of the sodium phosphate aqueous solution, and 5.5 ml of a magnesium sulfate aqueous solution was dropwise added instead of 7.0 ml of the magnesium sulfate aqueous solution.

EXAMPLE 7

The phosphor for VUV of Example 1 was further baked in the air at 600° C. for 1 hour to obtain a phosphor for VUV of Example 7.

COMPARATIVE EXAMPLE 1

The $Y_2O_3$:Eu phosphor of Example 1, which was not coated with magnesium phosphate, was used as a phosphor for VUV of Comparative Example 1.

COMPARATIVE EXAMPLE 2

Into a water slurry having 100 g of a $Y_2O_3$:Eu phosphor suspended therein, an aqueous solution having 0.11 g of magnesium ethoxide [$Mg(OC_2H_5)_2$] dissolved therein was added to prepare a phosphor slurry in a total amount of about 400 ml, and this phosphor slurry was adequately mixed with stirring for 20 minutes, dehydrated, dried and then baked at 600° C. for 1 hour to obtain a phosphor for VUV of Comparative Example 2 coated with magnesium oxide.

COMPARATIVE EXAMPLE 3

100 g of a $Y_2O_3$:Eu phosphor was suspended in water to prepare a phosphor slurry, and separately, 10 g of diammonium hydrogenphosphate [$(NH_4)_2HPO_4$] was dissolved in water to prepare an aqueous solution of diammonium hydrogenphosphate in a total amount of 1 l, 7.0 ml of which was added to the phosphor slurry, and this phosphor slurry was evaporated to dryness with stirring to obtain a phosphor for VUV of Comparative Example 3 coated with an oxide of phosphorus.

COMPARATIVE EXAMPLE 4

A phosphor for VUV of Comparative Example 4 coated with calcium phosphate was obtained in the same manner as in Example 1 except that 12.3 ml instead of 14.5 ml of the sodium phosphate aqueous solution was added to the phosphor slurry, and then 5.7 ml of a 200 g/l calcium nitrate [$Ca(NO_3)_2.4H_2O$] aqueous solution which was prepared separately was added instead of 7.0 ml of the magnesium sulfate aqueous solution.

COMPARATIVE EXAMPLE 5

A phosphor for VUV of Comparative Example 5 coated with zinc phosphate was obtained in the same manner as in Example 1 except that 9.8 ml instead of 14.5 ml of the sodium phosphate aqueous solution was added to the phosphor slurry, and then 5.5 ml of a 200 g/l zinc sulfate [$ZnSO_4.7H_2O$] aqueous solution which was prepared separately was added instead of 7.0 ml of the magnesium sulfate aqueous solution.

COMPARATIVE EXAMPLE 6

A phosphor for VUV of Comparative Example 6 coated with barium phosphate was obtained in the same manner as in Example 1 except that 6.3 ml instead of 14.5 ml of the sodium phosphate aqueous solution was added to the phosphor slurry, and then 6.8 ml of a 100 g/l barium acetate [$Ba(CH_3COO)_2.H_2O$] aqueous solution which was prepared separately was added instead of 7.0 ml of the magnesium sulfate aqueous solution.

Preparation of Phosphor Paste 25 g of an ethyl cellulose resin was dissolved in a mixed solvent comprising 10 g of butyl carbitol and 53 g of butyl carbitol acetate to prepare a resin solution. To this resin solution, 30 g of each of the phosphors for VUV excitation of Examples 1 to 7 and Comparative Examples 1 to 6 was added and adequately kneaded to prepare phosphor paste compositions of Examples 1 to 7 and Comparative Examples 1 to 6.

Quantitative Analysis of Coating Material on the Phosphor Surface

With respect to a coating material on each of the phosphors of Examples 1 to 7 and Comparative Examples 1 to 6, each phosphor was treated with nitric acid and dissolved, and subjected to quantitative analysis with respect to P and Mg, Ca, Zn or Ba elements in the coating material by means of an ICP (inductively coupled high-frequency plasma) analyzer, and the results are shown in Table 1.

Here, using as a reference sample the $Y_2O_3$:Eu phosphor of Comparative Example 1, wherein at least part of the surface was not coated, the amounts of the P element and the Mg element or other metal element in the coating material on each phosphor were quantitatively analyzed from the difference from analyzed values of the reference sample.

Preparation of Phosphor Layer

Each of the phosphor paste compositions of Examples 1 to 7 and Comparative Examples 1 to 6 was coated on a glass plate in a thickness of 0.5 mm and dried at 120° C. for 60 minutes, and then baked at 470° C. for 30 minutes to prepare thirteen phosphor layers of Examples 1 to 7 and Comparative Examples 1 to 6.

Measurement of Brightness Maintenance Ratio of Phosphor Layer

The thirteen phosphor layers of Examples 1 to 7 and Comparative Examples 1 to 6 were contained in a container, the inside of the container was purged by nitrogen gas, and the phosphor layers were irradiated with VUV having a central wavelength of 146 nm from a VUV generating excimer lamp (UER201A-146V, manufactured by Ushio Inc.), and the luminescence brightness (initial brightness) of each phosphor layer was measured by means of a brightness meter. Then, the phosphor layers were continuously irradiated with VUV and the luminescence brightness of each phosphor layer after 60 minutes (brightness after 60 minutes irradiation) was measured. Then, the relative percentage of the brightness after 60 minutes irradiation based on the initial brightness was obtained as the brightness maintenance ratio of each phosphor layer, and the VUV resistance of each phosphor for VUV was evaluated in accordance with the value of the brightness maintenance ratio. The results are shown in Table 1.

Here, in Table 1, the amounts of the P element and the other metal elements in the column of coating element are weight percentages based on the phosphor, and the values of the initial brightness are relative percentages when the initial brightness of the phosphor layer of Comparative Example 1 is 100.

TABLE 1

| | Coating material | Coating element and content (wt % based on phosphor) | | Initial brightness (1) (%) | Brightness after 60 min. irradiation (2) (%) | Brightness maintenance ratio ((2)/(1)) |
|---|---|---|---|---|---|---|
| Ex. 1 | Magnesium phosphate | Mg = 0.066 | P = 0.062 | 90 | 89 | 99 |
| Ex. 2 | Magnesium phosphate | Mg = 0.004 | P = 0.004 | 99 | 79 | 80 |
| Ex. 3 | Magnesium phosphate | Mg = 0.016 | P = 0.016 | 97 | 82 | 85 |
| Ex. 4 | Magnesium phosphate | Mg = 0.220 | P = 0.170 | 84 | 85 | 101 |
| Ex. 5 | Magnesium phosphate | Mg = 0.460 | P = 0.360 | 77 | 78 | 101 |
| Ex. 6 | Magnesium phosphate | Mg = 0.078 | P = 0.046 | 87 | 83 | 95 |
| Ex. 7 | Magnesium phosphate | Mg 0.065 | P = 0.061 | 90 | 89 | 99 |
| Comp. Ex. 1 | No coating | — | — | 100 | 72 | 72 |
| Comp. Ex. 2 | Magnesium oxide | Mg = 0.016 | — | 92 | 68 | 74 |
| Comp. Ex. 3 | Ammonium phosphate | — | P = 0.015 | 96 | 72 | 75 |
| Comp. Ex. 4 | Calcium phosphate | Ca = 0.090 | P = 0.047 | 100 | 71 | 71 |
| Comp. Ex. 5 | Zinc phosphate | Zn = 0.110 | P = 0.034 | 95 | 68 | 72 |
| Comp. Ex. 6 | Barium phosphate | Ba = 0.120 | P = 0.018 | 93 | 70 | 74 |

Evaluation

As evident from Table 1, the phosphors of Examples 1 to 7, which comprise a $Y_2O_3$:Eu phosphor, wherein at least part of the surface of the phosphor is coated with magnesium phosphate, had a particularly high brightness after irradiation with VUV for 60 minutes, and had a remarkably improved brightness maintenance ratio, as compared with the phosphor of Comparative Example 1 comprising a $Y_2O_3$:Eu phosphor which is not coated.

Further, the phosphors of Comparative Examples 2 and 3, which are coated with a compound containing only one of Mg and P elements, had the same or lower brightness maintenance ratio after 60 minutes irradiation as compared with the phosphor of Comparative Example 1, and no improvement in the brightness maintenance ratio as of the phosphors of Examples 1 to 7 was confirmed.

Further, the phosphors of Comparative Examples 4 to 6, which are coated with calcium phosphate, zinc phosphate and barium phosphate, respectively, had the same or lower brightness maintenance ratio after 60 minutes irradiation as compared with the phosphor of Comparative Example 1, and no improvement in the brightness maintenance ratio as of the phosphors of Examples 1 to 7 was confirmed.

Here, with respect to rare earth oxide type phosphors represented by the formula $(Y_{1-x-y}, Ln_x, Re_y)_2O_3$ such as a $(Y,Gd)_2O_3$:Eu phosphor, a $Y_2O_3$:Eu,Sm phosphor, a $Y_2O_3$:Tm phosphor and a $Y_2O_3$:Pr phosphor, in addition to the $Y_2O_3$:Eu phosphor, improvement in the brightness maintenance ratio of the phosphors could be confirmed in the same manner as the above Examples, by coating at least part of the surface of the phosphors with a compound containing both magnesium (Mg) and phosphorus (P) elements. Further, with phosphor layers using phosphor pastes obtained from these phosphors, the brightness maintenance ratio was high, and the decrease of the luminescence brightness could significantly be suppressed.

Preparation of Fluorescent Lamp

The phosphor paste composition of Example 1 was coated on an inner surface of a glass tube having an outer diameter of 4 mm, dried at 120° C. for 60 minutes and then baked at 550° C. for 10 minutes to form a phosphor layer on an inner wall of the glass tube.

Then, nickel electrodes were attached to both ends of the glass tube having the phosphor layer formed on the inner wall, the interior of the tube was evacuated to vacuum, then a mixed rare gas of Ne98%-Xe2% was introduced under a gas pressure of 50 Torr, and then both ends of the glass tube were sealed, to obtain a rare gas lamp.

An alternating voltage was applied to the obtained rare gas lamp for light emission, and the initial brightness at a center portion of the rare gas lamp immediately after application of the voltage and the brightness after a continuous lighting of 100 hours were measured, whereupon the brightness after continuous lighting of 100 hours was 90% of the brightness immediately after the initiation of lighting, and a high brightness maintenance ratio was confirmed.

As a comparison, a rare gas lamp was prepared in the same manner as mentioned above except that the phosphor paste composition of Comparative Example 1 was used, and the brightness maintenance ratio was measured, whereupon the brightness after continuous lighting of 100 hours decreased to 74% of the brightness immediately after the initiation of lighting.

According to the present invention, a rare earth oxide type phosphor for vacuum ultraviolet ray excitation, which has an improved VUV resistance, with which decrease of the luminescence brightness with time is extremely small even if irradiated with VUV having a wavelength of at most 200 nm for a long period of time, can be provided. Further, by employing a phosphor layer using the phosphor, a VUV excitation type light-emitting device, with which decrease of the luminescence brightness is extremely small even when the VUV excitation type light-emitting device is operated for a long period of time, can be provided.

The entire disclosure of Japanese Patent Application No. 2001-58260 filed on Mar. 2, 2001 including specification, claims and summary are incorporated herein by reference in its entirety.

What is claimed is:

1. A phosphor for vacuum ultraviolet ray excitation, which comprises a rare earth oxide type phosphor, wherein at least part of the surface of the rare earth oxide type phosphor is coated with a compound containing at least a magnesium element and a phosphorus element.

2. The phosphor for vacuum ultraviolet ray excitation according to claim 1, wherein the rare earth oxide type phosphor is represented by the following formula:

$(Y_{1-x-y}, Ln_x, Re_y)_2O_3$ wherein Ln is at lease one rare earth element selected from the group consisting of Gd, La and Lu, Re is at least one rare earth element selected from the group consisting of Eu, Tm, Sm and Pr, and x and y are numbers which satisfy conditions $0 \leq x \leq 1-y$ and $0.001 \leq y \leq 0.2$.

3. The phosphor for vacuum ultraviolet ray excitation according to claim 1, wherein the compound containing at least a magnesium element and a phosphorus element is a magnesium phosphate type compound.

4. The phosphor for vacuum ultraviolet ray excitation according to claim 1, wherein the content of magnesium is within a range of from 0.001 to 2 wt % on the basis of the weight of the rare earth oxide type phosphor.

5. The phosphor for vacuum ultraviolet ray excitation according to claim 1, wherein the content of phosphorus is within a range of from 0.001 to 2 wt % on the basis of the weight of the rare earth oxide type phosphor.

6. A phosphor paste composition comprising a binder solution and the phosphor for vacuum ultraviolet ray excitation as defined in claim 1, dispersed in the solution.

7. A vacuum ultraviolet ray excitation type light-emitting device comprising an envelope and a phosphor layer formed inside of the envelope, so that the phosphor layer is excited by vacuum ultraviolet rays generated by discharge of a rare gas sealed in the envelope, to emit light, wherein the phosphor layer comprises the phosphor for vacuum ultraviolet ray excitation as defined in claim 1.

* * * * *